Figure 3:
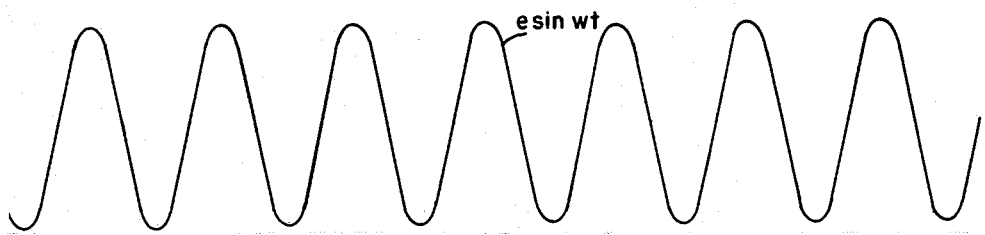

July 10, 1956
B. LIPPEL
2,754,493
INDICATOR FOR SOUND DIRECTION FINDER
Filed Feb. 4, 1955
2 Sheets-Sheet 1
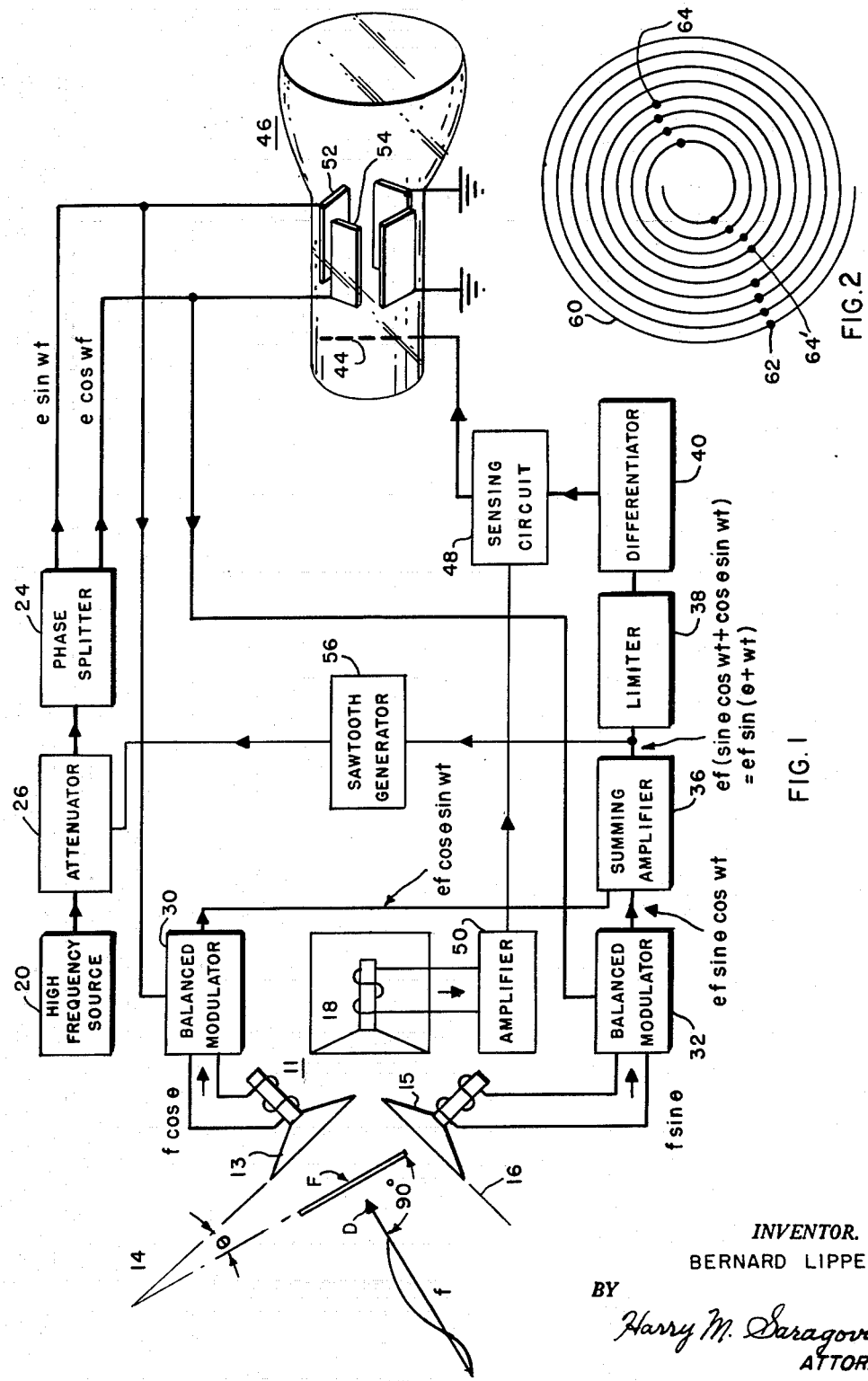
INVENTOR.
BERNARD LIPPEL
BY
Harry M. Saragovitz
ATTORNEY

_2,754,493_

_Patented July 10, 1956_

2,754,493

INDICATOR FOR SOUND DIRECTION FINDER

Bernard Lippel, Long Branch, N. J., assignor to the United States of America as represented by the Secretary of the Army Application February 4, 1955, Serial No. 486,300

5 Claims. (Cl. 340—16)

(Granted under Title 35, U. S. Code (1952), sec. 266)

The invention described herein may be manufactured and used by or for the Government for governmental purposes, without the payment of any royalty thereon.

This invention relates to a sound direction finding system including two adjacent directional sound receivers each having a cosine characteristic of sensitivity, providing a response proportional to the cosine of the angle of the sound wave front with respect to the sensitivity plane of that receiver. These receivers are oriented at right angles to give substantially mutually exclusive vector components corresponding to the direction of propagation of a traveling wave front across them. The relative values of the two components may be used to indicate the direction of propagation of the sound.

For accuracy in angular measurement it has been found essential that amplifiers for such a system provide exactly the same gain with identical phase shift and frequency response in both channels over wide ranges of total sound amplitude and vector components thereof. The difficulties in providing amplifiers having such gains linear throughout the operating range of the devices make them extremely expensive, heavy, and power-consuming; even when it is possible to use common portions of the amplifier systems to obtain most of the desired gain, as in carrier current or commutated amplifier systems, the mixing and sorting circuits require extremely careful design and frequent readjustment to maintain identical gain, phase shift, and frequency response. In any case adjustments in gain to correspond to the actual signal strength are needed to limit errors due to non-linearity to even an acceptable maximum.

It is possible to control by the received signals the outputs of a pair of balanced modulators energized by a single high frequency carrier, amplify such outputs, requiring separate high frequency amplifiers, and apply the two high frequency signals to the two deflecting means of a cathode ray tube to indicate the azimuth. A single gain control on the high frequency carrier is possible with such a system. Except for the source of the high frequency balanced modulator signals, the operation is identical to that of a crossed loop direction finder with cathode ray tube display in which the equivalent signal is produced by the actual high frequency signal traveling across the antenna loops.

In the system of this invention, also, the received signals are used to control balanced modulators energized by the same high frequency carrier, but the phases of the high frequency inputs to the balanced modulators are displaced 90°. The balanced modulator outputs are then combined to provide a high frequency signal having a phase relation to the original high frequency carriers determined by the relative values of the received sound signals, which values are dependent on the angle of the sound wave front relative to the sensitivity plane of the receivers.

The phase of this combined output wave may be readily preserved through any necessary amplifiers and compared to the phase of the original high frequency input signals by conventional means, such as a cathode ray tube. If the high frequency input signals are used to provide a circular trace on the cathode ray tube, and the combined high frequency signal is used to generate pulses in phase relation to the input signals corresponding to the angle of the sound wave front, these pulses may be shown on the circular trace as by a change in brilliance at a point corresponding to the azimuth of propagation of the sound signal. If at each arrival of a sound wave front the circular trace is converted temporarily to a spiral it is possible to distinguish the early portions of the sound signal, which ordinarily involves no reflections, from later portions of the sound signals, which are likely to involve various reflections and may appear to arrive from a direction other than that of the actual source of the wave. Furthermore, in the usual military application of sound direction finding devices for locating wave fronts resulting from explosions, the polarity of the generated voltages on the sound receivers is known to correspond at first to a pressure wave and therefore the first readings on the cathode ray tube screen can indicate the direction without ambiguity caused by the rarefaction following the pressure wave.

A typical embodiment of the invention is illustrated in the accompanying drawing, in which:

Fig. 1 indicates one suitable circuit block diagram.

Fig. 2 indicates the presentation of the received data on the cathode ray tube face.

Figs. 3 to 7 indicate typical waveforms to illustrate the manner of operation of the circuit.

In Fig. 1, a typical sound signal resulting from an explosion and having frequencies ordinarily in the range from 1 to 200 cycles/second is illustrated by the wave front F having a waveform such as that indicated by $f$, which may vary with time according to some empirical function usually similar to a highly damped low frequency oscillation, and is indicated as traveling in the direction D relative to the microphones 13 and 15, the sensitivity planes 14 and 16 of the respective microphones being at right angles. The sensitivity plane 14 of the microphone 13 is considered to be the reference plane for the array with which the angle of the wave front is to be compared; this angle is indicated as $\theta$. An additional non-directional pressure sensitive microphone 18 is also shown in the array and may be used as a sensing means as will be discussed later.

A high frequency source of carrier current 20 is connected to a phase splitter 24 through a circuit which may include an attenuator 26, if desired; actually the phase splitter and attenuator may be an integral part of the source. The phase splitter 24 provides two high frequency signals indicated as $e \sin wt$ and $e \cos wt$ to a pair of balanced modulators 30 and 32, respectively, where the two high frequency signals are modulated by the sound signals from microphones 13 and 15, $f \cos \theta$ and $f \sin \theta$, to provide product signals indicated as $ef \cos \theta \sin wt$ and $ef \sin \theta \cos wt$. These two signals from the balanced modulators are added in summing amplifier 36, and by trigonometry it will be seen that the sum corresponds to $ef \sin (\theta + wt)$. It is now apparent that the phase angle of this sum differs from the input high frequency signals to balanced modulator 30 by the phase angle $\theta$, equal to the directional angle $\theta$.

Although electronic, magnetic, and other balanced modulators are available it is also quite practical to use other types of circuits for this purpose. It may even be noted that certain types of sound receivers are particularly suitable to provide a balanced modulator type of signal without a separate element. For example, a hot-wire type of directional receiver as shown in Golay Patent 2,255,771, energized by the carrier, provides a balanced modulator type of signal without any other components.

It is quite simple to provide a pair of balanced modulators having the same ratio of input and output signals and a summing amplifier to combine the outputs. Once they are combined, only the phase need be considered and any amplification, clipping, differentiating, etc., may be accomplished in conventional circuits without any difficulties due to non-uniform gain. Any extreme differences in signal amplitude can be compensated by suitable attenuators, but actually the clipping eliminates most effects of moderate differences in signal.

This sum is supplied to limiter 38 and to differentiator 40 in order to obtain sharp pulses corresponding to the zero points of the combined high frequency signals and of a polarity corresponding to the direction of change of the voltage of such high frequency signal. These pulses are applied to the intensity control grid 44 of a cathode ray tube 46 through a circuit which may include a sensing means 48 to permit only pulses of the proper polarity to control the intensity of the trace on the cathode ray tube 46; this sensing means 48 may be controlled from an amplifier 50 connected to the pressure microphone 18 previously mentioned. The high frequency signals $e \sin wt$ and $e \cos wt$ are applied to deflection electrodes 52 and 54, respectively, of the cathode ray tube 46 and serve to provide a circular trace on the face of the cathode ray tube, subject to the intensity control electrode 44.

The conversion of the circular trace to a spiral trace can be accomplished by an auxiliary radial deflection electrode, an accelerating electrode, or many means known in the art of cathode ray tube displays, but for simplicity the means has been shown as a one-shot sawtooth generator 56 controlled by each signal output from the sum amplifier 36 and utilized to temporarily reduce the amplitudes of the signals $e \sin wt$ and $e \cos wt$. Since these amplitudes need not be reduced to any great extent to obtain the desired spiral trace 60 of Fig. 2 their effect on the balanced modulator circuits 30 and 32 will not be found objectionable.

Figure 7:
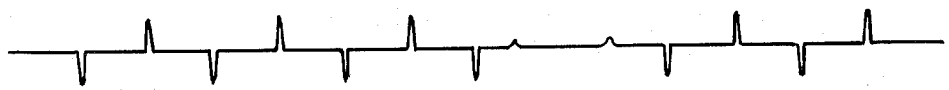

Ordinarily the function $f$ resulting from explosions will embody first a pressure wave followed by a rarefaction and therefore the polarity of the pulse outputs from the generator 40 will assure that the initial intensity changes 62 of Fig. 2 in the circular trace will correspond to the proper direction of propagation while the later intensity changes 64 will correspond to the reversed direction of propagation. However, the output of nondirectional microphone 18, through the amplifier 50 and sensing circuit 48, may be combined with the pulse outputs of the differentiator by (1) mere addition with only the peak values within the effective range of the cathode ray tube intensity control grid or (2) use of an "and" gate which passes only the corresponding pulses, so that only the intensity changes 62 at the proper azimuth can appear and others, 64, are eliminated; or (3) multiplication or (4) the use of double "and" gates, so that all intensity changes 62 and 64' appear on the trace at the proper azimuth whether the signals result from a pressure wave front or a rarefaction wave front. In any of these it will be apparent that positive and negative peaks of Fig. 7 are potentially available on the cathode ray tube, but only the desired ones are selected. Since the differentiated pulse, sensing voltage, and resultant grid voltage have no quantitative significance, the various alternatives are substantially equivalent. If the selection were omitted there would be a 180° ambiguity as to the direction of the source. In cases 3 and 4 the transition from pressure to rarefaction, if apparent at all, will involve only a gap in the row of dots, all at substantially the proper azimuth. It would not be possible to tell from the single trace whether the pressure or rarefaction occurred first; although a separate display could be provided if this information were believed necessary.

Figure 4:
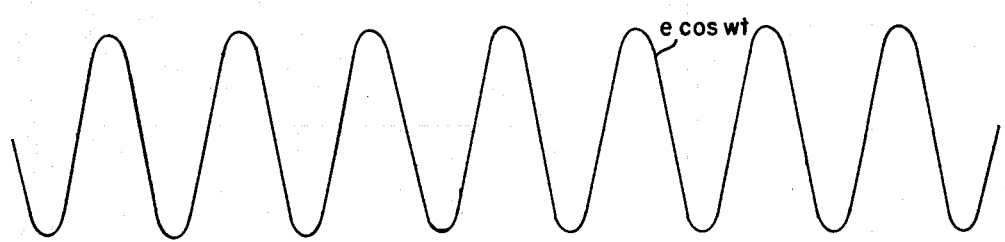
Figure 5:
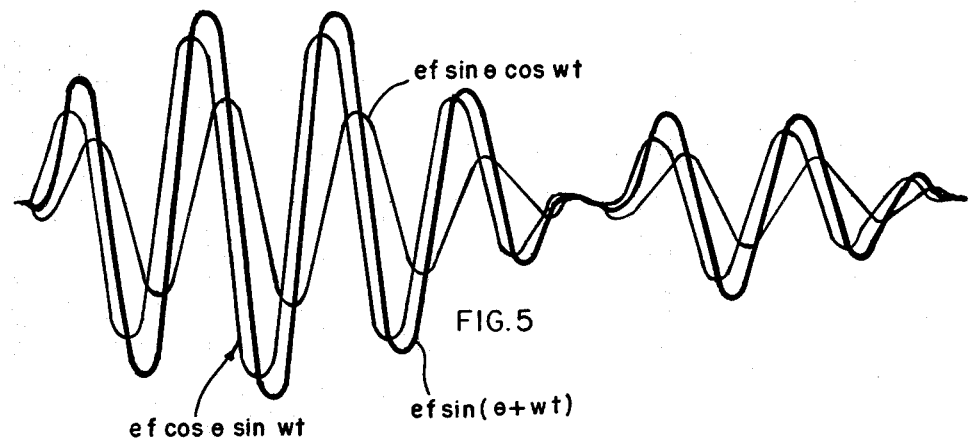
Figure 6:

Figs. 3 and 4 indicate the phase splitter outputs, $e \sin wt$ and $e \cos wt$ while Fig. 5 indicates the balanced modulator outputs and their sum $ef \sin (\theta + wt)$. Fig. 6 illustrates the effect of clipping this sum wave, and Fig. 7 illustrates the differentiated clipped sum wave. It will be noted that the envelope of the modulator outputs passes through zero when the pressure changes to a rarefaction and the wave forms after this time are inverted in phase. In the differentiated wave this is apparent by the reversed phase of the positive (and negative) pulses causing the dots 62 and 64 indicated in Fig. 2 to occur at both sides of the center of the cathode ray tube screen. If the sensing circuit 48 were in use the dots at the wrong azimuth would be either eliminated, or inverted to appear at the correct azimuth, depending on the type of sensing circuit.

A preferred embodiment of the invention has been described to facilitate an understanding of the invention, but many variations will be apparent to those skilled in the art.

What is claimed is:

1. A low frequency wave direction finder comprising a pair of crossed cosine characteristic balanced modulator-receivers each energized by a corresponding directional component of said low frequency wave and by one of two phase-displaced components of a high frequency wave, means for adding the outputs of said balanced modulators to provide a second high frequency wave having a phase relation to said first high frequency wave equal to the angle of arrival of said low frequency wave relative to said receivers, and means for comparing the phase of said high frequency waves to show the angle of arrival of said low frequency wave.

2. A low frequency wave direction finder comprising a pair of crossed cosine characteristic receivers, a pair of balanced modulators, each energized by the output of one of said receivers and by one of two phase-displaced components of a high frequency wave, means for adding the outputs of said balanced modulators to provide a second high frequency wave having a phase relation to said first high frequency wave equal to the angle of arrival of said low frequency wave relative to said receivers, and means for comparing the phase of said high frequency waves to show the angle of arrival of said low frequency wave.

3. A low frequency wave direction finder comprising a pair of crossed cosine characteristic receivers, a pair of balanced modulators, each energized by the output of one of said receivers and by one of two phase-displaced components of a high frequency wave, means for adding the outputs of said balanced modulators to provide a second high frequency wave having a phase relation to said first high frequency wave equal to the angle of arrival of said low frequency wave relative to said receivers, and means for comparing the phase of said high frequency waves to show the angle of arrival of said low frequency wave, said phase comparing means comprising a cathode ray tube having a beam intensity control, a central axis, and crossed deflection means energized by said two phase-displaced components to define a trace about said axis, limiter and differentiator means energized by said high frequency wave and connected to said beam intensity control to provide intensity modulated indications on said cathode ray tube at positions corresponding to the direction of arrival of said low frequency wave.

4. A low frequency wave direction finder comprising a pair of crossed cosine characteristic receivers, a pair of balanced modulators, each energized by the output of one of said receivers and by one of two phase-displaced components of a high frequency wave, means for adding the outputs of said balanced modulators to provide a second high frequency wave having a phase relation to said first high frequency wave equal to the angle of arrival of said low frequency wave relative to said receivers, and means for comparing the phase of said high frequency waves to show the angle of arrival of said low frequency wave, said phase comparing means comprising a cathode ray tube having a beam intensity control, a central axis, and crossed deflection means energized by said two phase-displaced components to define a trace about said axis, limiter and differentiator means energized by said high frequency wave and connected to said beam intensity control to provide intensity modulated indications on said cathode ray tube at positions corresponding to the direction of arrival of said low frequency wave, means responsive to each arrival of a low frequency wave to modify temporarily the radial displacement of said trace from said axis whereby indictations of initial portions of said low frequency wave are presented separately from those of following portions thereof.

5. A low frequency wave direction finder comprising a pair of crossed cosine characteristic receivers, a pair of balanced modulators, each energized by the output of one of said receivers and by one of two phase-displaced components of a high frequency wave, means for adding the outputs of said balanced modulators to provide a second high frequency wave having a phase relation to said first high frequency wave equal to the angle of arrival of said low frequency wave relative to said receivers, and means for comparing the phase of said high frequency waves to show the angle of arrival of said low frequency wave, said phase comparing means comprising a cathode ray tube having a beam intensity control, a central axis, and crossed deflection means energized by said two phase-displaced components to define a trace about said axis, limiter and differentiator means energized by said high frequency wave and connected to said beam intensity control to provide intensity modulated indications on said cathode ray tube at positions corresponding to the direction of arrival of said low frequency wave, means responsive to each arrival of a low frequency wave to modify temporarily the radial displacement of said trace from said axis whereby indications of initial portions of said low frequency wave are presented separately from those of following portions thereof, and means to eliminate ambiguity as to the actual direction of arrival of the low frequency wave comprising a non-directional receiver for said wave connected to select only those portions of the output of said differentiator which provide intensity modulated indications corresponding to the actual direction of arrival of the low frequency wave.

No references cited.